US012659189B2

(12) United States Patent
Shinohara

(10) Patent No.: US 12,659,189 B2
(45) Date of Patent: Jun. 16, 2026

(54) PACKET RELAY SYSTEM AND PACKET RELAY METHOD

(71) Applicant: NTT, Inc., Tokyo (JP)

(72) Inventor: Kenta Shinohara, Musashino (JP)

(73) Assignee: NTT, Inc., Tokyo (JP)

( * ) Notice: Subject to any disclaimer, the term of this patent is extended or adjusted under 35 U.S.C. 154(b) by 61 days.

(21) Appl. No.: 18/715,850

(22) PCT Filed: Dec. 6, 2021

(86) PCT No.: PCT/JP2021/044744
§ 371 (c)(1),
(2) Date: Jun. 3, 2024

(87) PCT Pub. No.: WO2023/105579
PCT Pub. Date: Jun. 15, 2023

(65) Prior Publication Data
US 2025/0039017 A1     Jan. 30, 2025

(51) Int. Cl.
*H04L 12/46*          (2006.01)
(52) U.S. Cl.
CPC ...... *H04L 12/4633* (2013.01); *H04L 12/4641* (2013.01)
(58) Field of Classification Search
CPC ........................ H04L 12/4633; H04L 12/4641
USPC ........................................................ 709/239
See application file for complete search history.

(56) References Cited

U.S. PATENT DOCUMENTS

| | | | |
|---|---|---|---|
| 9,515,947 B1 | 12/2016 | Lowe | |
| 2016/0248601 A1 | 8/2016 | Nomi | |
| 2019/0103990 A1 | 4/2019 | Cidon et al. | |
| 2019/0104063 A1* | 4/2019 | Cidon | ................... H04L 45/745 |

FOREIGN PATENT DOCUMENTS

| | | |
|---|---|---|
| JP | 2016152567 | 8/2016 |
| JP | 2020536403 | 12/2020 |

OTHER PUBLICATIONS

Infraexpert.com [online], "GRE (Generic Routing Encapsulation)" available on or before Jan. 2007, retrieved on Oct. 2021, retrieved from URL<https://www.infraexpert.com/study/rp8gre.htm>, 9 pages (with machine translation).

* cited by examiner

*Primary Examiner* — Wing F Chan
*Assistant Examiner* — Leon Y Tseng
(74) *Attorney, Agent, or Firm* — Fish & Richardson P.C.

(57) ABSTRACT

A packet relay system (1) includes a tenant (51) in which a plurality of tap devices (513, 514) terminating a tunneling protocol are built, a tenant (52) in which a plurality of tap devices (523, 524) are built, and a plurality of relay devices (41, 42) connecting the plurality of tenants (51, 52) and external devices (31, 32). The relay devices (41, 42) include respective connection management units (414, 424) that determine transfer destinations of packets received from the external devices (31, 32) based on header information of the packets.

5 Claims, 8 Drawing Sheets

Fig. 5

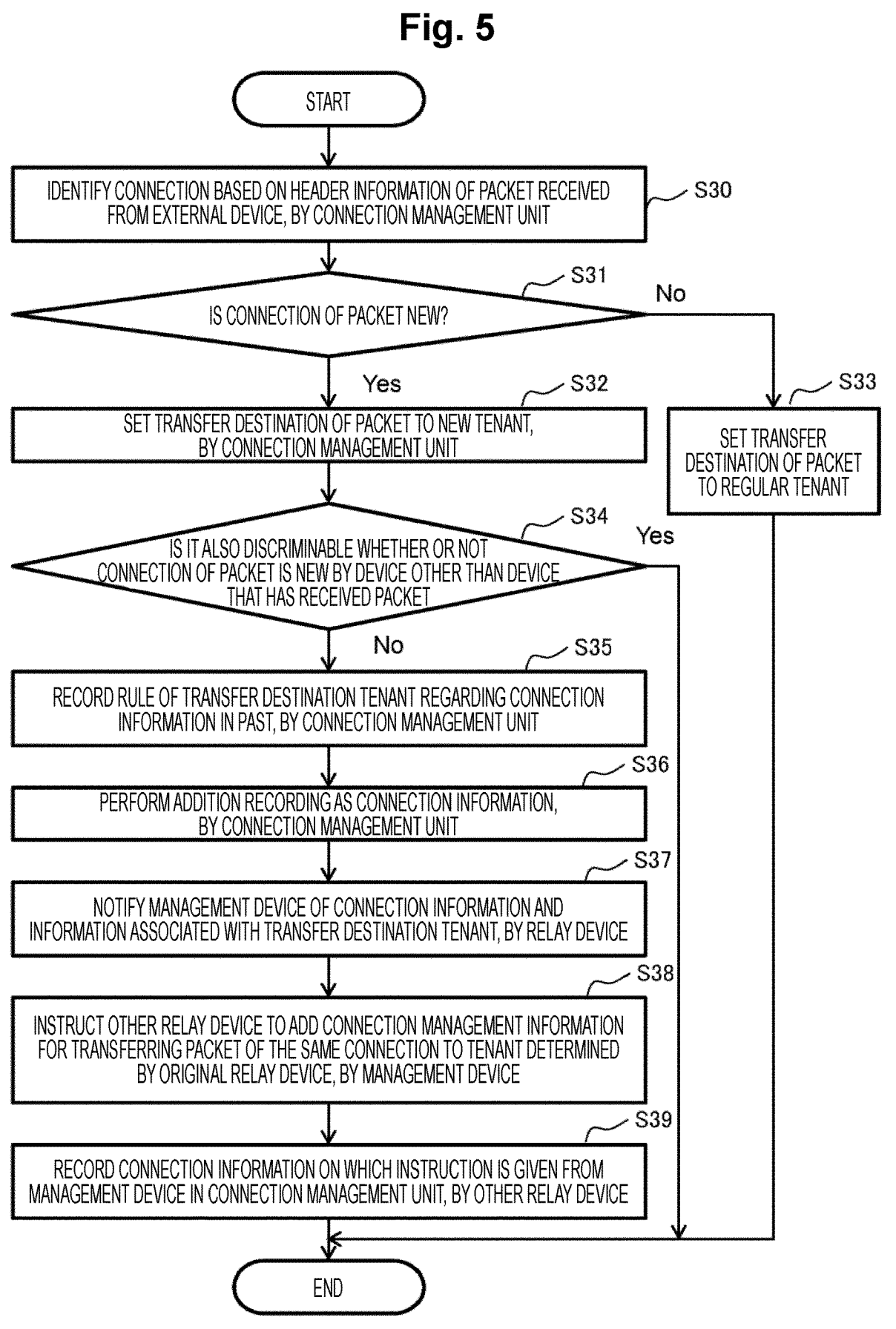

START

S30 — IDENTIFY CONNECTION BASED ON HEADER INFORMATION OF PACKET RECEIVED FROM EXTERNAL DEVICE, BY CONNECTION MANAGEMENT UNIT

S31 — IS CONNECTION OF PACKET NEW?

No →

S33 — SET TRANSFER DESTINATION OF PACKET TO REGULAR TENANT

Yes ↓

S32 — SET TRANSFER DESTINATION OF PACKET TO NEW TENANT, BY CONNECTION MANAGEMENT UNIT

S34 — IS IT ALSO DISCRIMINABLE WHETHER OR NOT CONNECTION OF PACKET IS NEW BY DEVICE OTHER THAN DEVICE THAT HAS RECEIVED PACKET

Yes →

No ↓

S35 — RECORD RULE OF TRANSFER DESTINATION TENANT REGARDING CONNECTION INFORMATION IN PAST, BY CONNECTION MANAGEMENT UNIT

S36 — PERFORM ADDITION RECORDING AS CONNECTION INFORMATION, BY CONNECTION MANAGEMENT UNIT

S37 — NOTIFY MANAGEMENT DEVICE OF CONNECTION INFORMATION AND INFORMATION ASSOCIATED WITH TRANSFER DESTINATION TENANT, BY RELAY DEVICE

S38 — INSTRUCT OTHER RELAY DEVICE TO ADD CONNECTION MANAGEMENT INFORMATION FOR TRANSFERRING PACKET OF THE SAME CONNECTION TO TENANT DETERMINED BY ORIGINAL RELAY DEVICE, BY MANAGEMENT DEVICE

S39 — RECORD CONNECTION INFORMATION ON WHICH INSTRUCTION IS GIVEN FROM MANAGEMENT DEVICE IN CONNECTION MANAGEMENT UNIT, BY OTHER RELAY DEVICE

END

PACKET RELAY SYSTEM AND PACKET RELAY METHOD

CROSS-REFERENCE TO RELATED APPLICATIONS

This application is a National Stage application under 35 U.S.C. § 371 of International Application No. PCT/JP2021/044744, having an International Filing Date of Dec. 6, 2021. The disclosure of the prior application is considered part of the disclosure of this application, and is incorporated by reference in its entirety into this application.

TECHNICAL FIELD

The present invention relates to a packet relay system that transfers a packet and a method for relaying a packet in a network apparatus.

BACKGROUND ART

With development of a software defined network (SDN) technology and a Network Function Virtualization (NFV) technology, there is a demand for flexible connection between a mobile terminal and a server on a cloud or the like. Therefore, a service that realizes packet transfer between a mobile terminal and a server by allowing a network user to control a packet transfer destination of a packet relay device on demand has been introduced.

As an example of a technology in the related art, a configuration is considered in which a tunneling protocol such as Internet Protocol Security (IPsec), VXLAN, or Generic Routing Encapsulation (GRE) is used, and routing software such as Open vSwitch is used for a packet relay device.

When a mobile terminal and a server on a cloud communicate packets to each other, it is common to execute a service using an IP address assigned to a packet relay device as a transmission destination of both packets. As a technique for supporting such a service, for example, there is GRE described in Non Patent Literature 1.

CITATION LIST

Non Patent Literature

Non Patent Literature 1: "Network Engineer toshite—GRE (Generic Routing Encapsulation) (in Japanese) (As a network engineer-GRE (Generic Routing Encapsulation)) ", [online], [Retrieved on Nov. 18, 2021], Internet <URL: https://www.infraexpert.com/study/rp8gre.htm>

SUMMARY OF INVENTION

Technical Problem

In the packet relay system, there is a case where it is desired to switch a tenant due to construction or the like of a physical server which a tenant operates. At this time, the tenant cannot be switched only for a specific packet.

Switching of a specific packet is a case where it is desired to switch only some traffic to a new tenant on a trial basis, a case where it is desired to switch traffic having a low latency requirement to another tenant, or the like. Moreover, switching only some traffic to the new tenant on a trial basis is also called pilot switching.

In this respect, an object of the present invention is to switch a specific packet to a desired tenant in a relay system including a plurality of tenants.

Solution to Problem

In order to solve the above problem, a packet relay system of the present invention includes: a plurality of tenants configured to have a plurality of virtual network devices terminating a tunneling protocol; and a plurality of relay devices that connect the plurality of the tenants and external devices. The relay device includes a connection management unit that determines a transfer destination of a packet, based on header information of the packet received from the external device.

Other means will be described in Description of Embodiments.

Advantageous Effects of Invention

According to the present invention, in a relay system including a plurality of tenants, it is possible to switch a specific packet to a desired tenant.

BRIEF DESCRIPTION OF DRAWINGS

FIG. 5 is a flowchart of a process of distributing new packets by the connection management unit.

DESCRIPTION OF EMBODIMENTS

Hereinafter, embodiments for implementing the present invention will be described in detail with reference to the drawings.

Figure 1:
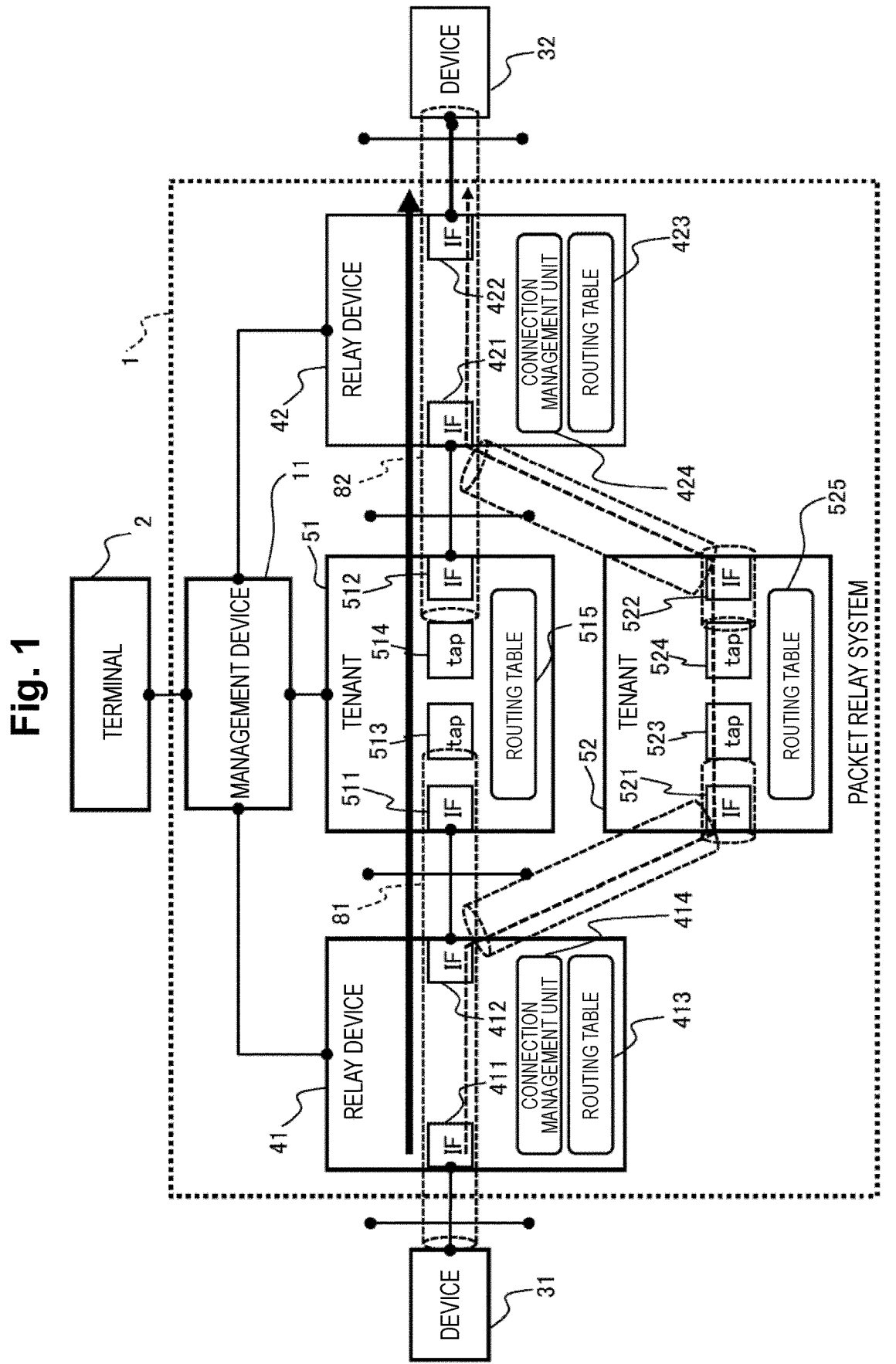
FIG. 1 is a diagram illustrating an operation of distributing packets to a plurality of tenants in a packet relay system according to an embodiment.

FIG. 1 is a configurational diagram illustrating a packet relay system 1 according to this embodiment.

The packet relay system 1 is configured to include a management device 11, a plurality of tenants 51 and 52, and relay devices 41 and 42 arranged before and after the tenants. The packet relay system 1 is connected to a device 31 that is an external device via a tunnel 81 and is connected to a device 32 that is an external device via a tunnel 82. The plurality of tenants 51 and 52 are a plurality of units and are each built as, for example, a container, a virtual machine, or a physical device.

The management device 11 builds the plurality of tenants 51 and 52 on the basis of an instruction to add a tenant from a terminal 2. Accordingly, the management device 11 instructs the relay devices 41 and 42 on a transmission destination switching rule.

Further, the management device 11 performs a conversion process on information notification of new connection received from the relay devices 41 and 42 and instructs the opposite relay devices 42 and 41 to add connection information.

The relay device 41 includes a connection management unit 414 in addition to a network interface 411 on a left-hand side, a network interface 412 on a right-hand side, and a routing table 413. The relay device 41 connects a plurality of tenants 51 and 52 and an external device 31. The connection management unit 414 has a function of analyzing a packet received from the device 31 and determining whether the packet is in accordance with a rule on which an instruction is given in advance from the management device 11. The connection management unit 414 determines a transfer destination of a packet based on header information of the packet received from the device 31.

These network interfaces 411 and 412 are connected to adjacent devices to transmit and receive packets. The routing table 413 is, for example, a forwarding information base (FIB). The routing table 413 is set to permit a packet received from one of the network interfaces 411 and 412 to be transferred from the other to the outside.

Similarly, the relay device 42 also includes a connection management unit 424 in addition to network interfaces 421 and 422 and a routing table 423. The relay device 42 connects the plurality of tenants 51 and 52 and the external device 32. The connection management unit 424 has a function of analyzing a packet received from the device 32 and determining whether the packet is in accordance with a rule on which an instruction is given in advance from the management device 11. The connection management unit 424 determines a transfer destination of a packet based on header information of the packet received from the device 32.

The tenant 51 includes a network interface 511 on a left-hand side, a network interface 512 on a right-hand side, and a routing table 515. A plurality of tap devices 513 and 514 terminating a tunneling protocol is further built into the tenant 51. These tap devices 513 and 514 are virtual network devices.

The tenant 52 also includes a network interface 521 on the left-hand side, a network interface 522 on the right-hand side, and a routing table 525, and tap devices 523 and 524 are built.

Figure 2:
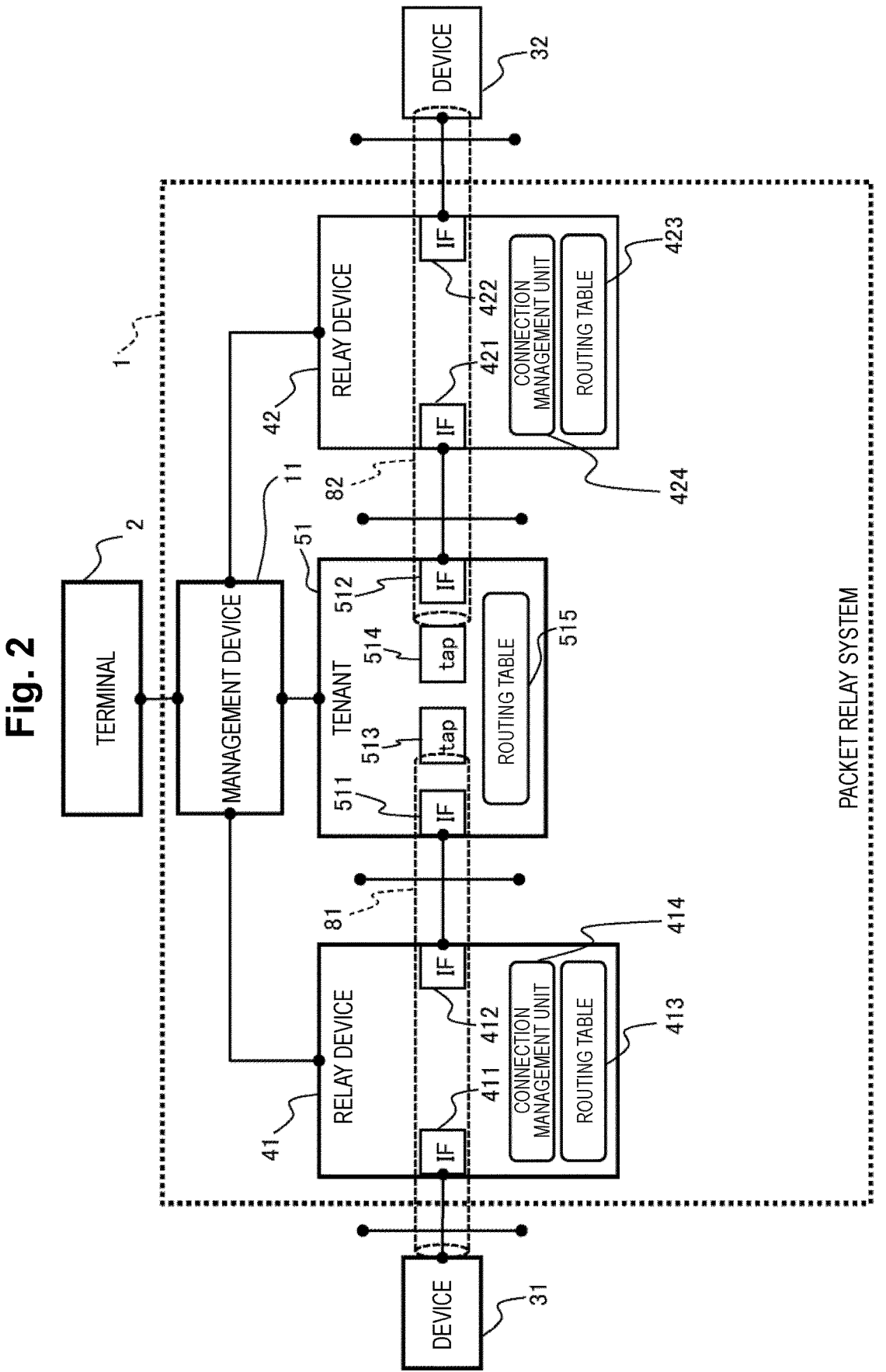
FIG. 2 is a diagram illustrating a configuration in which a tenant having two network interfaces and relay devices which are arranged before and after the tenant are arranged.

FIG. 2 is a diagram illustrating a configuration in which a tenant having two network interfaces and relay devices which are arranged before and after the tenant are arranged.

The packet relay system 1 of FIG. 2 does not include a tenant 52 as compared with the packet relay system 1 of the embodiment illustrated in FIG. 1.

The relay devices 41 and 42 are connected to the devices 31 and 32 via a network capable of transmitting and receiving IP packets. As a basic operation, the relay devices 41 and 42 transmit a packet of the tunneling protocol transmitted from one of the devices 31 and 32 to the tenant 51. The relay devices 41 and 42 further have a role of transmitting the packet of the tunneling protocol transmitted from the tenant 51 to the other of the devices 31 and 32.

The tenant 51 is connected to the relay device 41 via a network in which IP packets can be transmitted and received by the network interface 511. The tenant 51 is further connected to the relay device 42 via a network in which IP packets can be transmitted and received by the network interface 512.

In addition, the tenant 51 has the tap devices 513 and 514 that terminate the transfer protocol. As a basic operation, when a packet of the tunneling protocol transmitted from the device 31 arrives at the network interface 511, the tenant 51 terminates the tunneling protocol at the tap device 513. Accordingly, the tenant 51 performs encapsulation with the other tap device 514 and transfers the encapsulated packet to the opposite device 32.

Similarly, when a packet of the tunneling protocol transmitted from the device 32 arrives at the network interface 512, the tenant 51 terminates the tunneling protocol at the tap device 514. Accordingly, the tenant 51 performs encapsulation with the other tap device 513 and transfers the encapsulated packet the opposite device 31.

Figure 3:
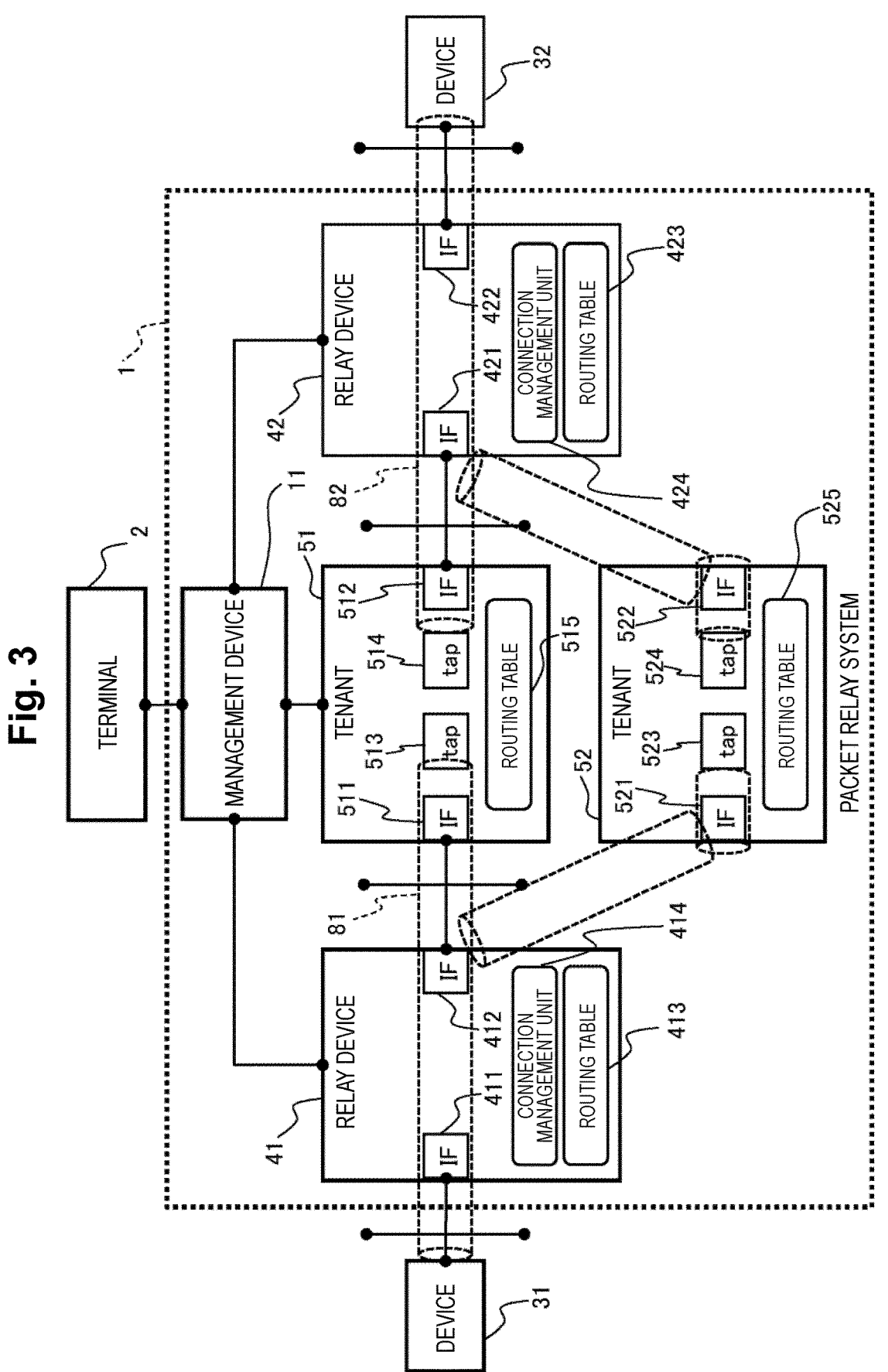
FIG. 3 is a diagram illustrating a configuration of the packet relay system according to the present embodiment in which a plurality of tenants are each provided to have two network interfaces and relay devices are arranged before and after the plurality of tenants.

FIG. 3 is a diagram illustrating a configuration in which a plurality of tenants are each provided to have two network interfaces and relay devices 41 and 42 are arranged before and after the tenant.

The connection management unit 414 identifies a connection based on header information of a packet received from the external device 31. Accordingly, the connection management unit 414 determines a transfer destination tenant of a packet, based on a predetermined rule. It is assumed that an instruction on the rule is given in advance from the management device 11. The connection management unit 414 can determine a tenant as a packet transfer destination based on these predetermined rules and switch a specific packet to a desired tenant. The same applies to the connection management unit 424. For example, the connection management unit 414 sets a transfer destination in a case where the packet relates to traffic with a low latency requirement and a transfer destination in a case where the packet relates to traffic with a non-low latency requirement to different tenants, respectively. Consequently, the packet can be distributed to appropriate tenants according to the delay requirement of the packet.

Rule 1 is a rule for transmitting a certain percentage of packets to the new tenant 52 according to the number of packets received from the device 31 and transmitting the other packets to the regular tenant 51.

Rule 2 is a rule for discriminating whether a connection is a new connection from header information of a packet and transmitting the new connection to the new tenant 52.

Rule 3 is a rule for transferring packets received from the devices 31 and 32 to both the tenants 51 and 52. That is, the connection management unit 414 simultaneously transmits the packet received from the external device 31 to the plurality of tenants 51 and 52.

In the case of a rule that requires management of past connections as in Rule 2, the connection management units 414 and 424 record the rule of the transfer destination tenant for the past connection information. Accordingly, in a case where it is necessary to newly determine the transfer destination as in Rule 2, the connection management units 414 and 424 additionally record the rule as the connection information.

In a case where it is possible to discriminate whether or not the connection of the packet is new only from the packet, one of the relay devices 41 and 42 notifies the management device 11 of the connection information in order to propagate path information to the other relay device. The management device 11 notifies the other relay device of the connection information, so that even if a certain connection is communication from either the device 31 or the device 32, the connection is transferred via a unique tenant.

By applying these rules, it is possible to perform desired switching in a case where it is desired to switch only some traffic to a new tenant on a trial basis or in a case where it is desired to switch traffic having a low latency requirement to another tenant.

<<Rule 1>>

Figure 4:
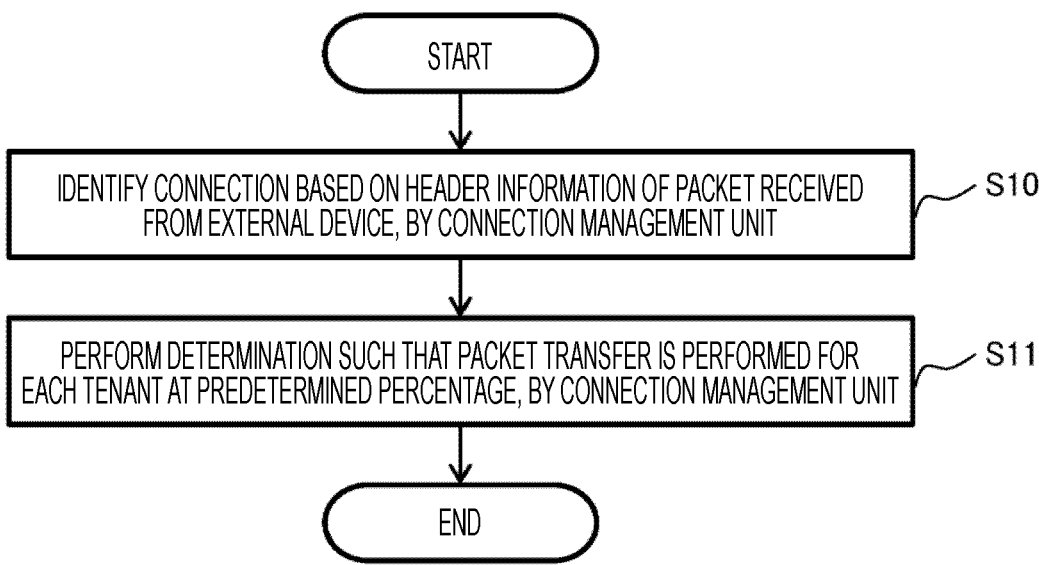
FIG. 4 is a flowchart of a transfer percentage determining process by a connection management unit.

FIG. 4 is a flowchart of a transfer percentage determining process by the connection management unit 414. Here, the connection management unit 414 is described as an operation subject, but the connection management unit 424 may be the operation subject.

In step S10, the connection management unit 414 identifies the connection based on header information of a packet received from the external device 31 Accordingly, in step S11, the connection management unit 414 determines a transfer destination tenant of a packet, based on a predetermined rule. It is assumed that an instruction on the rule is given in advance from the management device 11.

In step S11, when the connection management unit 414 determines that the packet received from the device 31 is transferred to a predetermined percentage thereof for each of the tenant 51 and the tenant 52, the process in FIG. 4 is ended.

<<Rule 2>>

FIG. 5 is a flowchart of a process of distributing new packets by the connection management unit. Here, the connection management unit 414 is described as an operation subject, but the connection management unit 424 may be the operation subject.

<<Rule 2>>

In step S30, the connection management unit 414 identifies the connection based on header information of a packet received from the external device 31 Accordingly, in step S31, the connection management unit 414 determines whether or not the connection of this packet is new.

In step S31, when the connection of this packet is not new and is a regular connection (No), the connection management unit 414 proceeds to step S33. In a case where the transfer destination of this packet is the regular tenant, the process of FIG. 5 is ended. When the connection of this packet is new (Yes), the connection management unit 414 proceeds to step S32.

In step S32, the connection management unit 414 sets the transfer destination of the packet to a new tenant. Accordingly, in step S34, the connection management unit 414 determines whether a device other than the device that has received the packet can also discriminate whether the connection of the packet is new. When a device other than the device that has received the packet can also discriminate whether the connection of the packet is new (Yes), the connection management unit 414 ends the process of FIG. 5. When a device other than the device that has received the packet cannot discriminate whether the connection of the packet is new (No), the connection management unit 414 proceeds to step S35.

In step S35, the connection management unit 414 records the rule of the transfer destination tenant with respect to the past connection information and additionally records the rule as connection information (step S36).

Next, the relay device 41 notifies the management device 11 of the connection information and association information of the transfer destination tenant (step S37). That is, in a case where it is possible to discriminate whether or not a connection related to a packet is new only from this packet, the connection management unit 414 notifies the management device 11 of information of this connection. Consequently, when any of the plurality of relay devices connected to the tenant receives a new connection, the connection information can be added to another relay device.

The management device 11 instructs the other relay device 42 to add connection management information for transferring a packet of the same connection to the tenant determined by the original relay device 41 (step S38).

When the connection information on which an instruction is given from the management device 11 is recorded in the connection management unit 424 (step S39), the other relay device 42 ends the processing of FIG. 5.

Consequently, a packet related to new traffic can be transmitted to the new tenant, and it is possible to gradually transition from the regular tenant to the new tenant without adversely affecting the regular traffic.

Figure 6:
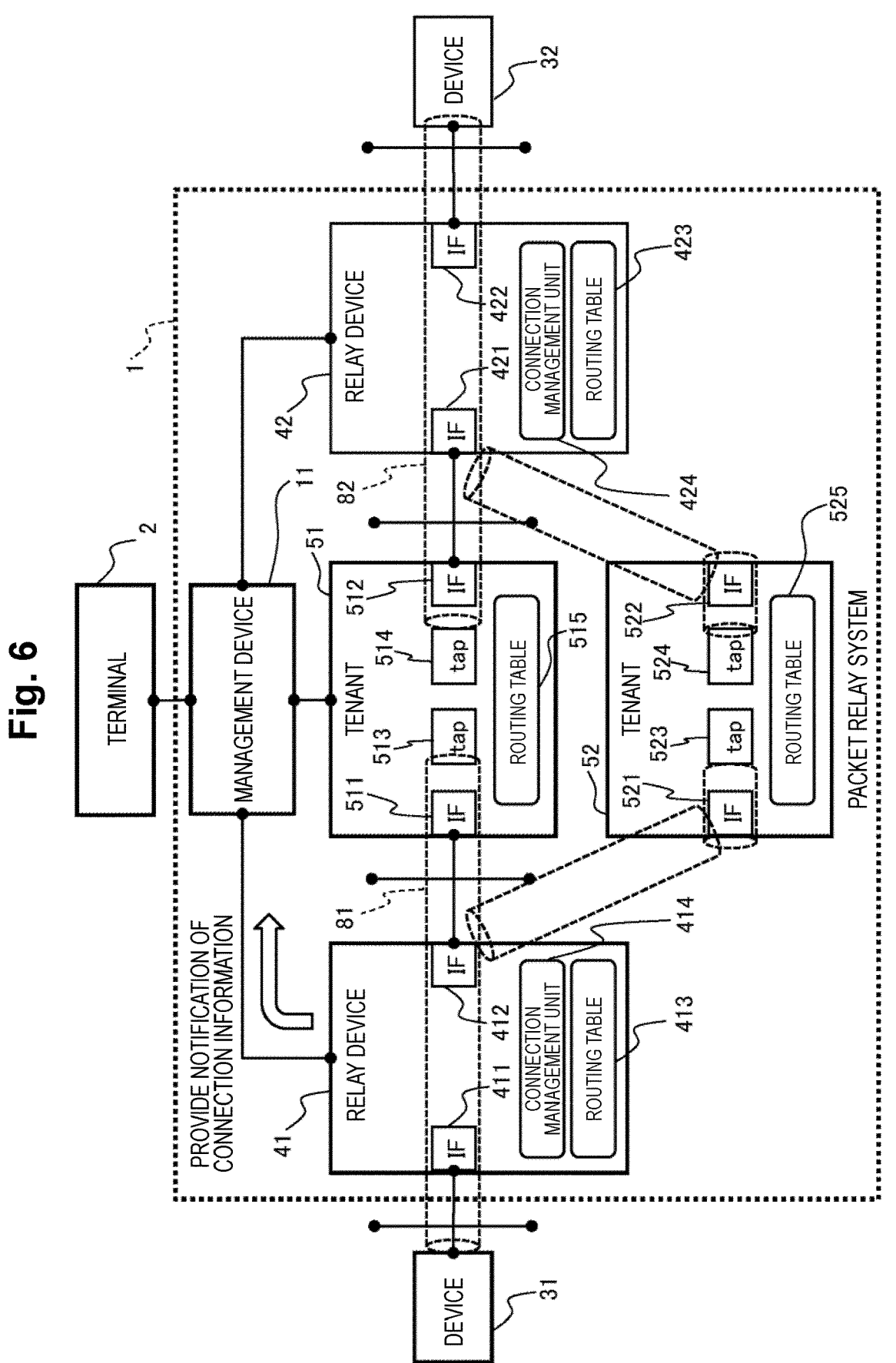
FIG. 6 is a diagram illustrating connection information notification.

FIG. 6 is a diagram illustrating connection information notification.

When only the relay device 41 that has received the packet can discriminate whether the connection of this packet is new, the relay device 41 notifies the management device 11 of the connection information in order to propagate the path information to the relay device 42.

When this is not performed, while the packet of the new connection from the device 31 to the device 32 passes through the tenant 52, there is no guarantee that the packet from the device 32 to the device 31 passes through the tenant 52. The connection information and the association information of the transfer destination tenant newly recorded in the connection management unit 414 by the relay device 41 are transmitted to the management device 11.

Figure 7:
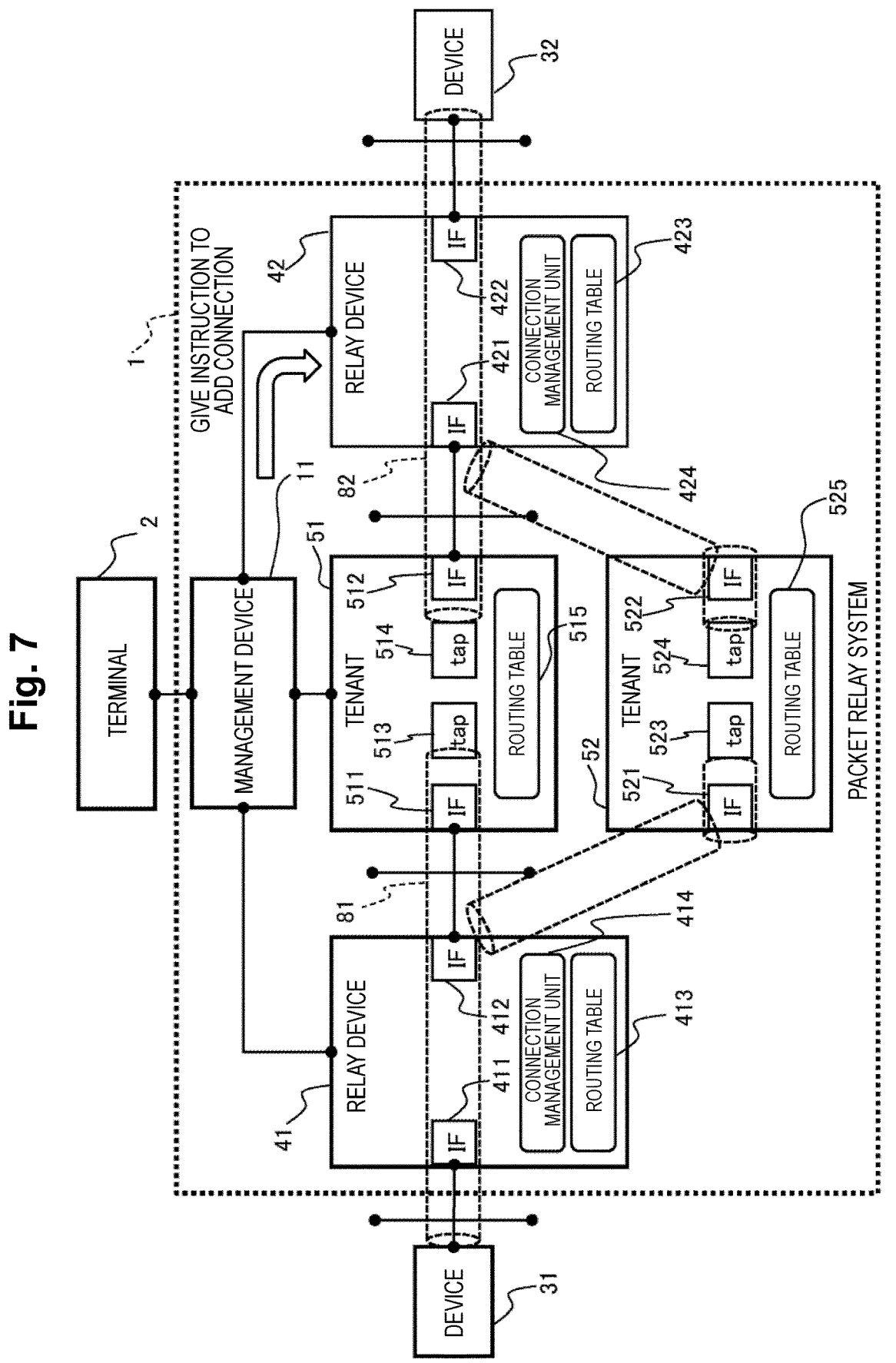
FIG. 7 is a diagram illustrating an instruction to add connection information.

FIG. 7 is a diagram illustrating an instruction to add connection information.

When the management device 11 receives the information on the new connection from the relay device 41, the management device 11 instructs the relay device 42 to add the connection management information. Consequently, the management device 11 can transfer the packet of the same connection to the tenant 52 determined by the relay device 41.

In the relay device 41 and the relay device 42, encapsulation schemes of passing packets may not match, and packet frames do not necessarily match. Therefore, the management device 11 notifies the relay device 41 of the connection information notification of which is provided to the relay device 42 after performing a conversion process on the basis of a type of transfer protocol used in the relay device 41 and the relay device 42.

The relay device 42 records the connection information on which an instruction is given from the management device 11 in the connection management unit 424. Consequently, a state in which a packet for the same connection transmitted from the device 32 is transferred to the tenant 52 is realized.

<<Rule 3>>

Figure 8:
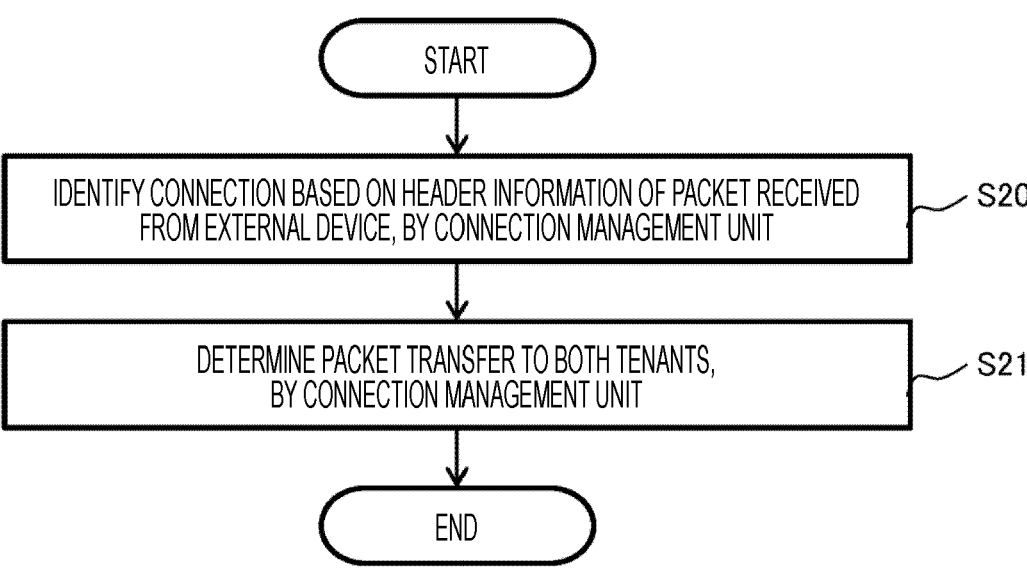
FIG. 8 is a flowchart of a transfer determining process to both tenants by the connection management unit.

FIG. 8 is a flowchart of a transfer determining process to both of the tenants 51 and 52 by the connection management unit 414. Moreover, the connection management unit 424 also performs a similar process.

In step S20, the connection management unit 414 identifies the connection based on the header information of the packet received from the device 31.

In step S21, when the connection management unit 414 determines to transfer the packet received from the device 31 to both the tenant 51 and the tenant 52, the process of FIG. 8 is ended. Consequently, it is possible to simultaneously transmit the packet to a plurality of tenants, improve the reliability of packet transmission, and stop the regular tenant that is in operation.

Effects

Hereinafter, effects of the packet relay system and the like according to the present invention will be described.

A packet relay system includes:

a plurality of tenants configured to have a plurality of virtual network devices terminating a tunneling protocol; and a plurality of relay devices that connect the plurality of the tenants and an external device, wherein the relay device includes a connection management unit that determines a transfer destination of a packet, based on header information of the packet received from the external device.

Consequently, in a relay system including a plurality of tenants, it is possible to switch a specific packet to a desired tenant. Hence, in a case of construction or the like of a physical server which is operated by a tenant, the tenant can be switched.

In the packet relay system according to claim 1, the connection management unit determines a tenant of a packet transfer destination, based on a predetermined rule.

Consequently, the packet arriving at the relay device can be transferred to the determined tenant.

In the packet relay system according to claim 1, the connection management unit sets a transfer destination of the packet to a new tenant when the packet relates to new traffic.

Consequently, a packet related to new traffic can be transmitted to the new tenant, and it is possible to gradually transition from the regular tenant to the new tenant without adversely affecting the regular traffic.

The packet relay system according to claim 3, further includes a management device that manages the plurality of tenants and the plurality of relay devices, in which in a case where it is possible to discriminate whether or not a connection related to the packet is new, only from the packet, the connection management unit notifies the management device of information of the connection, and the management device instructs another relay device different from the relay device to add the connection.

Consequently, when any of the plurality of relay devices connected to the tenant receives a new connection, the connection information can be added to another relay device.

In the packet relay system according to claim 1, the connection management unit sets a transfer destination in a case where the packet relates to traffic with a low latency requirement and a transfer destination in a case where the packet relates to traffic with a non-low latency requirement to different tenants, respectively.

Consequently, the packet can be transferred to appropriate tenants according to the delay requirement of the traffic related to the packet.

In the packet relay system according to claim 1, the connection management unit simultaneously transmits a packet received from an external device to the plurality of the tenants.

Consequently, it is possible to simultaneously transmit the packet to a plurality of tenants, improve the reliability of packet transmission, and stop the regular tenant that is in operation.

A method for relaying a packet includes:

a step of building, by a plurality of tenants, a plurality of virtual network devices terminating a tunneling protocol; and a step of determining, by a relay device that connects the plurality of the tenants and an external device, a transfer destination of a packet, based on header information of the packet received from the external device.

Consequently, in a relay system including a plurality of tenants, it is possible to switch a specific packet to a desired tenant. Hence, in a case of construction or the like of a physical server which is operated by a tenant, the tenant can be switched.

REFERENCE SIGNS LIST

1 Packet relay system
11 Management device
2 Terminal
31, 32 Device
41 Relay device
411, 412 Network interface
413 Routing table
414 Connection management unit
42 Relay device
421, 422 Network interface
423 Routing table
424 Connection management unit
51 Tenant
511, 512 Network interface
513, 514 tap device
515 Routing table
52 Tenant
521, 522 Network interface
523, 524 tap device
525 Routing table
81 Tunnel
82 Tunnel

The invention claimed is:

1. A packet relay system comprising:

a processor and a memory device storing instructions, wherein execution of the instructions causes the processor to implement:

a plurality of tenants configured to have a plurality of virtual network devices terminating a tunneling protocol;

a plurality of relay devices configured to connect the plurality of tenants and an external device; and a management device configured to manage the plurality of tenants and the plurality of relay devices, wherein a relay device of the plurality of relay devices includes a connection management unit configured to identify a connection based on header information of a packet received from the external device, determine that the connection related to the packet is new only from the packet, set a transfer destination of the packet to a new tenant, and notify the management device of information of the connection, the management device is configured to instruct another relay device different from the relay device to add the connection.

2. The packet relay system according to claim 1, wherein the connection management unit is configured to determine a tenant of a packet transfer destination, based on a predetermined rule.

3. The packet relay system according to claim 1, wherein the connection management unit is configured to set the transfer destination based on the packet relating to traffic with a low latency requirement and set the transfer destination based on the packet relating to traffic with a non-low latency requirement to different tenants, respectively.

4. The packet relay system according to claim 1, wherein the connection management unit is configured to simultaneously transmit a packet received from the external device to the plurality of tenants.

5. A method for relaying a packet, comprising:

building, by a plurality of tenants, a plurality of virtual network devices terminating a tunneling protocol;

identifying a connection, by a relay device that connects the plurality of tenants and an external device, based on header information of the packet received from the external device;

determining, by the relay device, that the connection related to the packet is new only from the packet;

setting, by the relay device, a transfer destination of the packet to a new tenant;

notifying, by the relay device, a management device of information of the connection; and instructing, by the management device, another relay device different from the relay device to add the connection.

* * * * *